July 17, 1956 W. F. OCENASEK 2,754,859
TABLE-GRIPPING RIPPING FENCES
Original Filed Jan. 29, 1950 4 Sheets-Sheet 1
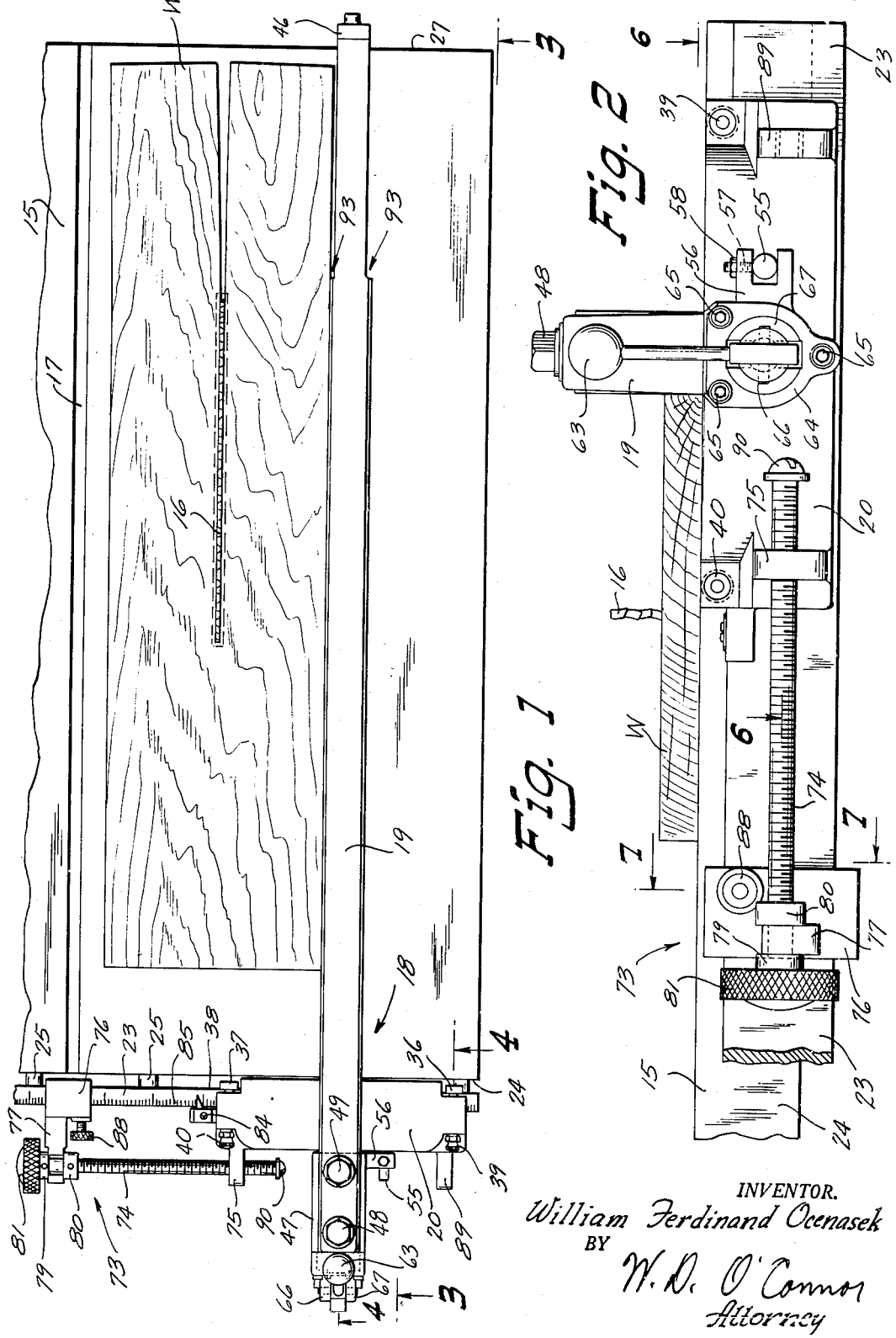
INVENTOR.
William Ferdinand Ocenasek
BY
W. D. O'Connor
Attorney July 17, 1956 W. F. OCENASEK 2,754,859
TABLE-GRIPPING RIPPING FENCES
Original Filed Jan. 29, 1950 4 Sheets-Sheet 2
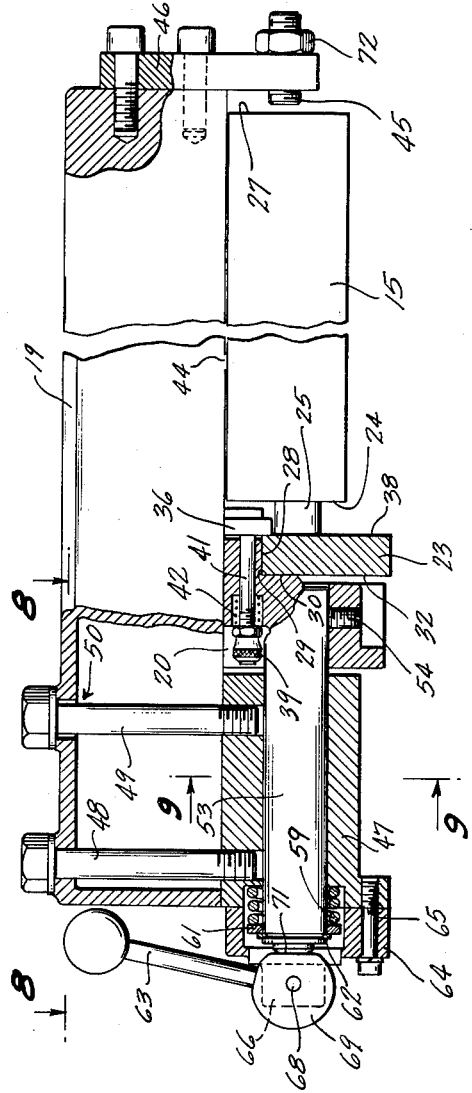
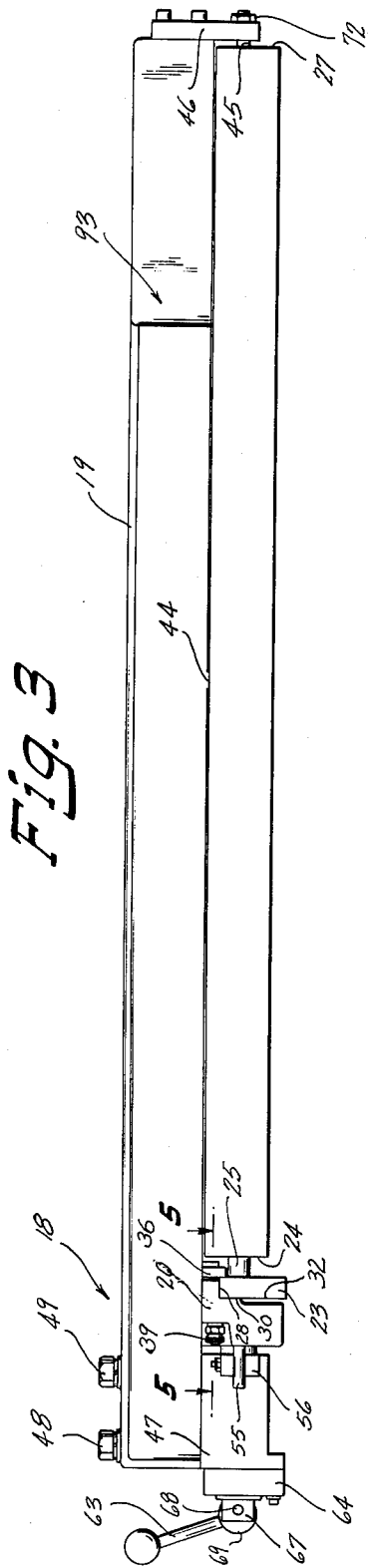
INVENTOR.
William Ferdinand Ocenasek
BY W. D. O'Connor
Attorney

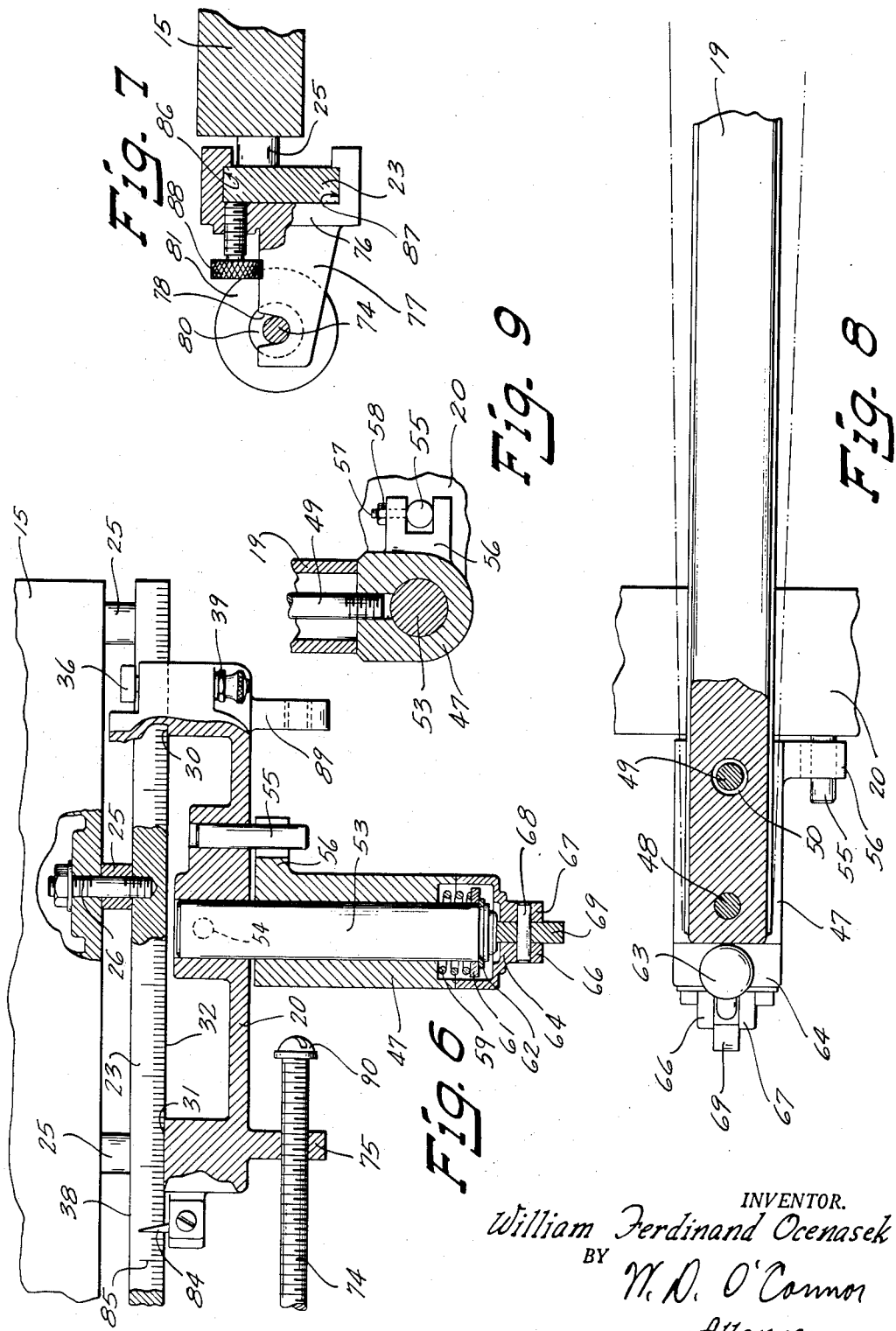

July 17, 1956  W. F. OCENASEK  2,754,859
TABLE-GRIPPING RIPPING FENCES
Original Filed Jan. 29, 1950  4 Sheets-Sheet 4
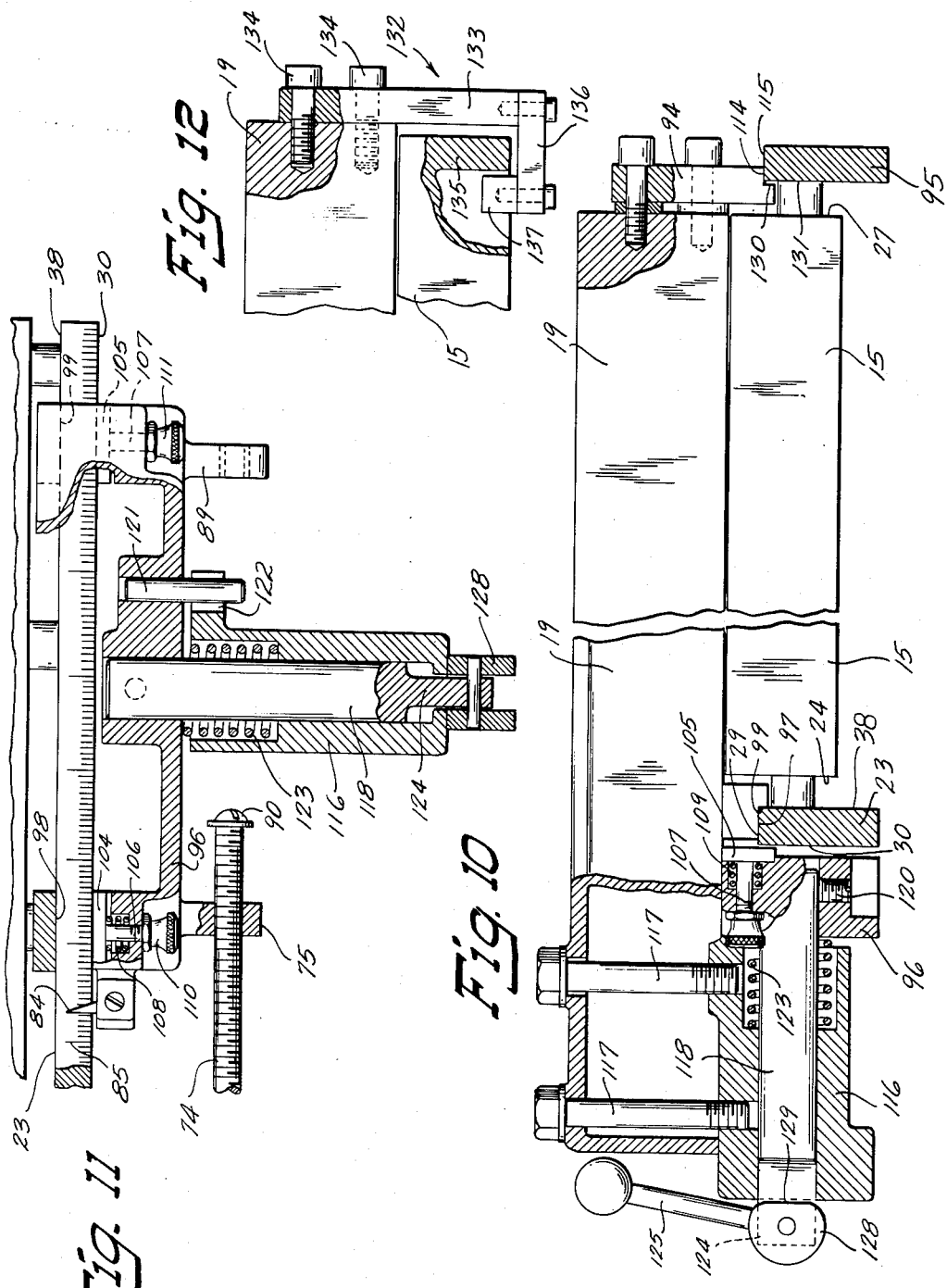
INVENTOR.
William Ferdinand Ocenasek
BY
W. D. O'Connor
Attorney

United States Patent Office 2,754,859
Patented July 17, 1956

2,754,859
TABLE-GRIPPING RIPPING FENCES

William Ferdinand Ocenasek, South Plainfield, N. J., assignor, by mesne assignments, to Rockwell Manufacturing Company, a corporation of Pennsylvania Continuation of application Serial No. 139,881, January 29, 1950. This application March 31, 1952, Serial No. 279,576

10 Claims. (Cl. 143—174)

The present application is a continuation of my pending application entitled Ripping Fences, Serial No. 139,881, filed January 21, 1950, and now abandoned.

This invention relates generally to improvements in sawing machines and more particularly to an improved ripping fence or work gauge for guiding a workpiece along the work supporting table of the machine as it is fed to the saw blade in a ripping operation.

Another object is to provide a ripping fence having improved guiding means for facilitating lateral adjustment in combination with improved locking means for clamping the fence to the table in a predetermined position of adjustment.

Another object is to provide a ripping fence having an improved clamping arrangement for clamping the fence to the work supporting table at both its front and rear ends.

Another object is to provide improved guiding means for a ripping fence that operate automatically to align the fence member in parallelism with the saw blade.

Another object is to provide a laterally slidable guiding carriage disposed to support a ripping fence perpendicularly for a relatively slight longitudinal clamping movement relative to the carriage.

Another object is to provide a ripping fence for a sawing machine so arranged that the rearward end of the fence may be clamped to the saw table by longitudinal movement of the fence.

Another object is to provide in combination with a saw table an improved ripping fence comprising a gauge bar movably secured to a guiding carriage and being adapted to be clamped to the table by effecting a relatively slight clamping movement of the gauge bar relative to the carriage.

Another object is to provide an improved arrangement for clamping a ripping fence to the table of a sawing machine without effecting any lateral or angular movement of the fence during the clamping operation.

A further object is to provide improved supporting means for a ripping fence disposed to minimize friction during lateral adjustment of the fence along the surface of the table.

A further object is to provide an improved ripping fence constructed in such a manner as to minimize the possibility of kickback during a ripping operation.

A still further object is to provide an improved adjusting mechanism arranged to facilitate precise lateral adjustment of the ripping fence along the table of the machine.

According to this invention, a circular sawing machine is provided with a ripping fence having an improved carriage slidably carried at the front edge of the table and disposed to guide the fence for lateral adjustment therealong. To retain the fence member in spaced parallelism relative to the saw blade, resilient means are arranged to urge a stationary bearing surface of the carriage into guiding engagement with a rectangular guide bar spaced outwardly from and secured to the front edge of the table. The fence is slidably supported by the carriage for a relatively slight longitudinal movement and is normally urged in one direction by resilient means in the carriage. To lock the fence to the table in a selected position of adjustment therealong, a clamp lever pivotally carried at the front end of the fence is operative to effect bodily longitudinal movement of the fence relative to the carriage in a manner that a depending locking element fixedly secured to the rearward end thereof is brought into engagement with the rearward edge of the table. With the clamp lever in locked position, a clamping action is effected between the downwardly depending locking element at the rearward end of the fence and a bearing surface of the carriage that slidably engages the guide bar.

The foregoing and other objects of the invention which will become more fully apparent from the following detailed description of apparatus exemplifying the invention, may be achieved by the ripping fence described herein as a preferred embodiment thereof in connection with the accompanying drawings, in which:

Figure 1 is a plan view of a circular sawing machine provided with an improved ripping fence embodying the novel features of this invention, part of the saw table having been broken away;

Fig. 2 is a view in front elevation of the sawing machine and the improved work guiding ripping fence shown in Fig. 1;

Fig. 3 is a view in side elevation of the machine showing the ripping fence in locked position on the machine table;

Fig. 4 is an enlarged fragmentary view showing the front end of the fence and its supporting carriage in longitudinal vertical section taken along the line 4—4 of Fig. 1, and showing the rearward portion of the fence in side elevation, the fence being in unlocked position on the table;

Fig. 5 is an enlarged fragmentary view in horizontal section showing a resiliently urged contact shoe mounted in the carriage and taken along the line 5—5 of Fig. 3;

Fig. 6 is a view in horizontal section of the fence supporting structure including the guiding carriage, taken along the line 6—6 of Fig. 2;

Fig. 7 is an enlarged fragmentary view in transverse vertical section through the adjusting bracket for the fence, taken along the line 7—7 of Fig. 2;

Fig. 8 is an enlarged fragmentary view in horizontal section on the line 8—8 of Fig. 4, through the front end of the fence;

Fig. 9 is a view in transverse vertical section through the front end of the fence and its support member, taken along the line 9—9 of Fig. 4;

Fig. 10 is a fragmentary view partly in longitudinal vertical section and partly in side elevation of a modified form of the ripping fence;

Fig. 11 is a view in horizontal section through the supporting structure including the guiding carriage for the modified ripping fence; and Fig. 12 is a fragmentary view in vertical section through the rearward end of the ripping fence, showing a modified form of rear clamping element.

Referring more specifically to the drawings, and particularly to Figs. 1 and 2 thereof, the machine there shown is a sawing machine of the circular type that is provided with an improved ripping fence embodying the features of the present invention. As is usual in machines of this type, the supporting base or frame presents at its top a work supporting surface or table 15 having a centrally located slot through which a circular saw blade 16 projects. The saw blade 16 is mounted within the base (not shown) in a manner to rotate in the slot for performing a cutting operation on work supported upon the table 15 and is provided with the usual driving mechanism (not shown). A longitudinal groove 17, formed in the surface of the table 15 in parallel spaced relationship with the saw blade 16, serves to receive a miter gauge or the like to position work for sawing in a well known manner.

For guiding a workpiece, for example, the workpiece W shown in Fig. 1, along the surface of the table 15 as it is fed to the saw blade 16 in performing a ripping operation, there is provided an improved ripping fence or work gauge 18 constructed in accordance with the principles of this invention. The ripping fence 18 comprises essentially a gauge bar or longitudinal fence member 19 supported on the top surface of the table 15 in parallel relationship with the plane of the saw blade 16. The bar or member 19 is arranged for lateral adjustment relative to the saw blade 16 and accordingly is supported at its front end by a guiding carriage 20 slidably mounted at the front edge of the table. The carriage 20 is slidably supported to provide transverse adjustment of the fence relative to the saw blade 16 by means of a rectangularly shaped guide bar 23 spaced outwardly from and secured to the front vertical edge 24 of the table with spacers 25 and studs 26, as shown in Figs. 1 and 6. The guide bar 23 is positioned in parallelism with the vertical front edge 24 and a corresponding vertical rear edge 27 of the table 15, as well as being disposed in a plane perpendicular to the saw blade 16, in order to guide the carriage 20 for adjustable slidable movement in a plane perpendicular to the plane of the saw blade. To establish the fence member 19 in parallelism with the saw blade 16 in any of its laterally adjusted positions along the surface of the table 15, the carriage 20 is disposed to support the fence member 19 in a plane perpendicular to the plane in which the carriage 20 is transversely movable.

As shown in Figs. 4 and 6, the carriage 20 is provided toward its inner and upper edge with a horizontal bearing surface 28 disposed to overlie and slidably engage a top surface 29 of the guide bar 23 which is disposed in parallelism with the top surface of the table 15. At the inner opposite sides of the carriage 20 there are provided a pair of spaced vertical bearing surfaces 30 and 31, respectively, normally disposed to engage the front guiding surface 32 of the guide bar 23. The vertical bearing surfaces 30 and 31 are adjacent to and perpendicular to the horizontal bearing surface 28 of the carriage in manner to constitute therewith a flanged bearing arranged to cooperate with the front and top guiding surfaces of the guide bar 23, respectively, for guiding the carriage 20 along a line or a path of movement which is parallel to the top surface of the table 15 and perpendicular to the plane of the saw blade 16.

To retain the spaced vertical bearing surfaces 30 and 31 in engagement with the front surface 32 of the guide bar 23, a pair of contact shoes 36 and 37 are movably carried at the opposite sides of the carriage 20 in such manner as to be resiliently urged toward the carriage and into guiding or abutting engagement with the rearward vertical surface 38 of the guide bar in opposed relationship with the surfaces 30 and 31. To place the carriage 20 and its associated fence member 19 bodily upon the machine in their cooperating work guiding positions, as shown in Fig. 1, with the carriage 20 in slidable engagement with the guide bar 23, each of the contact shoes 36 and 37 is disposed to be movable in a rearward direction out of its position of engagement with the rearward surface 38 of the guide bar. To this end, a pair of manually movable adjusting knobs 39 and 40 at the opposite front sides of the carriage 20 are operatively connected to effect rearward movement of the contact shoes 36 and 37, respectively, in a direction opposite to their normal resiliently urged direction of movement. As shown in Figs. 4 and 5, the adjusting knob 39 is secured to the outer end of a plunger rod 41 slidably carried in a horizontally bored hole formed in the carriage 20 for axial movement and having its inner end secured to the contact shoe 36. A compression spring 42 seated within an enlarged part of the bored hole formed in the carriage 20 engages the enlarged hub of the adjusting knob 39 to urge the contact shoe 36 toward the carriage and into resiliently maintained guiding engagement with the rearward vertical surface 38 of the guide bar 23.

The construction of the flanged bearing surfaces and cooperating contact shoes 36 and 37 is especially advantageous whenever it is necessary to remove the fence from the table and replace it thereon at the opposite sides of the saw blade. This arrangement of the carriage obviates completely the necessity for sliding the fence lengthwise along the guide bar or tilting it upwardly relative to the table in order to remove it therefrom, as has sometimes been necessary in prior types of guiding fences for circular sawing machines.

The resilient movement of the contact shoes 36 and 37 into engagement with the rearward surface 38 of the guide bar 23 normally operates to urge the carriage 20 rearwardly in manner that the inner vertical bearing surfaces 30 and 31 formed thereon are brought into abutting engagement with the front surface of the guide bar 23. Thus, the resilient action of the contact shoes 36 and 37 relative to the guide bar 23 provides an automatically operative means for aligning the carriage 20 in a plane perpendicular to the plane of the saw blade 16, and, concomitantly therewith, for aligning the longitudinal fence member 19 in a plane parallel to the plane of the saw blade 16. Even though the fence member 19 may be forced from its position of parallelism relative to the saw blade 16 during lateral adjustment of the work gauge 18 relative thereto, the contact shoes 36 and 37 are urged into engagement with the guide bar 23 to reestablish the exact parallelism of the fence 19 relative to the saw blade 16 at the conclusion of the adjusting movement, and prior to clamping the fence to the table 15 in a predetermined position of adjustment thereon.

As shown in Figs. 1 and 3, the fence member 19 extends longitudinally across the top surface of the table 15 from the front edge to the rearward edge thereof and in parallelism with the saw blade 16. To minimize the friction which would result if the entire underside of the fence 19 were in direct contact with the top surface of the table 15, a relatively narrow bearing surface 44 is formed on the underside of the fence toward the center rearward portion thereof. To facilitate lateral adjustment of the fence 19 along the surface of the table 15, the entire weight of the work gauge 18 is thus supported only by the bearing surface 44 slidably engaging the top surface of the table and the horizontal bearing surface 28 of the carriage 20 slidably engaging the top surface 29 of the rectangular guide bar 23.

Included among the principal advantages afforded by this invention are the ease and convenience with which the work gauge 18 may be laterally adjusted relative to the saw blade 16, as well as the fact that the work guiding fence 19 is positioned in exact parallelism with the saw blade as soon as lateral adjustment has been effected. Some prior types of ripping fences for circular sawing machines have been so constructed that there was not only considerable friction as the fence was laterally adjusted along the table, but also an unavoidable angular misalignment of the fence relative to the saw blade after the lateral adjusting movement had been completed. This necessitated reestablishing the fence in proper work guiding parallelism with the saw blade by manual means and was usually accomplished during the operation of clamping the fence to the table. In prior work gauges, it has been customary to provide a fence secured at its front end to a guiding carriage which was, in turn, slidably supported for lateral adjustment on either a rectangular or a cylindrical guide bar secured to the front edge of the table. As heretofore constructed, however, the opposed bearing surfaces of a carriage that were disposed to engage the front and rear guiding surfaces of a rectangularly shaped guide bar, for example, were ordinarily formed by milling a slot in the underside of the carriage with the front and rear vertical sides of the slot constituting relatively immovable bearing surfaces.

Regardless of the manner in which the immovably opposed bearing surfaces of the carriage were constructed, it was necessary that sufficient clearance be provided between the bearing surfaces of the carriage and the respectively associated guiding surfaces of the rectangular guide bar to minimize friction as the carriage was slidably adjusted therealong. Even with minimum clearance between the carriage bearing surfaces and the guide bar, the carriage could be moved angularly a slight distance relative to the guide bar as it was moved therealong in effecting a lateral adjustment relative to the saw blade. Since the opposed bearing surfaces of the carriage were relatively immovable, the carriage of prior fences would remain in an angularly misaligned position relative to the guide bar and, consequently, would be angularly positioned relative to a plane perpendicular to the sawing tool. The longitudinal fence member being perpendicularly secured at its front end to the guiding carriage was thus moved in a corresponding direction out of parallelism with the saw blade and, consequently, out of its proper work guiding relationship therewith. Inasmuch as the fence member is usually three to six times as long as the carriage bearing surfaces, the degree of misalignment of the fence relative to the saw blade would be proportionately larger than the degree of misalignment of the carriage relative to the rectangular guide bar.

In these prior types of ripping fences, it was necessary to reestablish the fence in work guiding parallelism with the saw blade by actuating movable clamping means arranged to urge either the front or rear bearing surface of the carriage into abutting engagement with the guide bar. The movable locking means have been customarily provided at the front or the rearward end of the fence for movement relative thereto in urging the fence and the carriage as a unitary structure into proper alignment with the saw blade and into a stationarily clamped position on the table. As will be readily apparent, the locking action utilized to reestablish the fence in parallelism with the saw blade would effect an angularly lateral movement of the fence along the table as the vertical bearing surface of the carriage was brought into abutting engagement with the guide bar at the front of the table. The additional lateral movement of the gauge bar during the rocking operation introduced an indeterminate error into the process of laterally adjusting the fence a predetermined measured distance from the saw blade. As a result, it was often necessary to release the ripping fence from locking engagement with the table in order to readjust it thereon into a position approximately the required measured distance from the saw blade. It was sometimes necessary to readjust the position of the fence several times before the manual clamping action effected an angular displacement of the fence into a parallel spaced position relative to the saw blade which was also the exact measured distance therefrom required for a particular sawing operation. Therefore with the types of construction heretofore employed, it became a process of trial and error to adjust the fence laterally along the table into a properly spaced position parallel to the saw blade.

This difficulty is completely obviated in the present invention in which, as shown in Fig. 1, the resiliently movable contact shoes 36 and 37 operate to urge the carriage 20 into properly aligned guiding engagement with the front surface 32 of the guide bar 23 and thus maintain the fence member 19 in parallelism with the saw blade 16. The contact shoes 36 and 37 also provide yieldable bearing surfaces disposed to facilitate lateral adjustment of the ripping fence 19 by preventing the locking or binding action sometimes encountered between the immovably opposed bearing surfaces used in prior types of fence carirages and the guide bar. The work gauge 18 illustrated in Fig. 1 can be moved along the table 15 by exerting lateral pressure against the far rearward end of the fence member 19 instead of against the supporting carriage 20 if desired. Even though the fence 19 is angularly displaced from parallelism with the saw blade 16 during such lateral adjustment, there is no tendency of the carriage to lock or bind on the guide bar 23. In prior types of ripping fences, however, an excessive angular displacement of the fence from parallelism with the saw blade tended to create a locking or binding action between the immovable bearing surfaces of the carriage and the associated guiding surfaces of the guide bar, thus hindering lateral adjusting movement of the fence along the table.

For securing the ripping fence to the work table 15 in any adjusted position, there is provided an improved locking arrangement for clamping the work gauge 18 to the table at its front and rear ends simultaneously, and in such a manner as to obviate additional angular or lateral displacement of the fence 19 from its predetermined spaced position relative to the saw blade 16 during the clamping operation. To achieve this result, the clamping action is effected by a longitudinal bodily movement of the fence relative to its guiding carriage and to the table. As shown in Figs. 3 and 4, the fence member 19 is slidably carried by the carriage 20 to provide for a relatively slight longitudinal movement in a direction toward the front of the table 15. An adjustable locking element 45 carried by a depending bracket 46 secured to the rearward end of the fence 19 is then moved therewith into clamping engagement with the rearward vertical edge 27 of the table 15. As shown in Fig. 4, the fence member 19 is secured at its forward end to a support member 47 by means of bolts 48 and 49. The rearward bolt hole 50, Figs. 4 and 8, formed in the upper surface of the fence member 19 is enlarged somewhat to permit a slight angular adjustment of the fence relative to its support member 47 for establishing true parallelism with the saw 16. To effect the longitudinal clamping movement of the fence 19 relative to the carriage 20, the support member 47 is slidably carried by a circular guide bar 53 fitted into a bored hole formed in the carriage 20 and secured therein by means of a set screw 54. The circular guide bar 53 extends forwardly from the carriage 20 in a plane perpendicular to the plane of the stationary vertical bearing surfaces 30 and 31 and parallel to the plane of the horizontal bearing surface 28 of the carriage. Thus, the support member 47 and the fence 19 secured thereto is guided for longitudinal movement in a plane perpendicular to the carriage.

To prevent rotational movement of the support member 47 about the circular guide bar 53 and to maintain the work guiding surfaces of the fence 19 in a vertical plane perpendicular to the upper surface of the table 15, a circular pilot rod 55 is secured to the carriage 20 in axial parallelism with the circular guide bar 53 in such manner as to be engaged by the forked arms of a bracket 56 extending from the support member 47, as shown in Figs. 6 and 9. An adjusting screw 57 threaded through one arm of the bracket 56 and retained in adjusted position by means of a lock nut 58, is disposed to maintain close slidable engagement with the pilot rod 55.

The support member 47 and fence 19 are resiliently urged in a rearwardly direction relative to the carriage 20 by means of a compression spring 59 encircling the forward end of the circular guide bar 53 in a manner that the adjustable locking element 45 at the rearward end of the fence is retained in disengaged or unclamped position relative to the rearward edge 27 of the table. The spring 59 is disposed within and seated at one end against the bottom of a socket formed in the front end of the support member 47, its other end being seated against a thrust washer 61 retained in position on the front end of the guide bar 53 by means of a snap ring 62 engaging an annular groove formed therein.

To effect forward longitudinal clamping movement of the fence 19 in opposition to the resiliently urged rearward movement effected by the compression spring 59, there is provided toward the front end of the support member 47 a pivotally movable clamp lever 63. The lever 63 is pivotally carried by a forwardly extending cover or housing 64 secured to the front end of the support member 47 by means of screws 65, Fig. 2, in manner to enclose the outer end of the circular guide bar 53. A pair of guide lugs 66 and 67 extending outwardly from the housing in spaced parallelism are connected by a pin 68 extending through an enlarged cam shaped lower end 69 of the lever 63 to constitute the pivot therefor. The lower cam shaped end 69 of the lever is arranged to project through a vertical slot formed between the lugs 66 and 67 at the front end of the housing 64 in a manner to be in operative abutting engagement with the front end of the circular guide bar 53. With the lever 63 in a vertical or unclamped position, as shown in Fig. 4, a flat surface 71 formed on the lower cam shaped end of the lever engages the front end of the guide bar 53 to limit the resiliently urged rearward movement of the support member 47 and the longitudinal fence 19. With the lever 63 in unclamped position, as shown in Fig. 4, the adjustable clamp element 45 secured to the rearward end of the fence 19 is in disengaged or unclamped position relative to the rearward vertical edge 27 of the table.

As the lever 63 is pivoted forwardly into a clamped position, the lower cam shaped end 69 thereof is rotated relative to the front end of the circular guide bar 53 to effect movement of the fence 19 in a forward direction relative to the carriage 20, and operates to urge the locking element 45 at the rearward end thereof into abutting engagement with the rearward edge of the table 15. It will be apparent that the locking element 45 is urged into clamping engagement with the rearward table edge in opposition to the abutting engagement of the vertical bearing surfaces 30 and 31 of the carriage with the front guide bar 23. The bearing surfaces 30 and 31 are continuously urged into abutting engagement with the front surface of the guide bar 23 by action of the resiliently biased bearing pads 36 and 37 carried by the carriage. Thus the entire work gauge 18 is arranged to be clamped to the work table 15 with great rigidity and in exact parallelism with the saw blade 16 for guiding a workpiece along the table in performing a ripping operation.

As shown in Figs. 3 and 4, the rear locking element 45 may be adjusted in its supporting bracket 46 toward or away from the rearward edge 27 of the table and may be retained in adjusted position by means of a lock nut 72. By adjusting the position of the locking element 45 in its bracket 46, the pivoted position of the clamp lever 63 for effecting clamped engagement of the fence 19 to the table 15 may be varied to suit the convenience of the operator. This arrangement is likewise advantageous in compensating for slight variations in the size of the cooperating parts that may occur in the course of the machining and manufacturing operations.

For effecting accurate mechanical displacement of the fence 19 along the surface of the table 15, as shown in Figs. 1 and 2, there is provided an improved adjusting mechanism 73 comprising a screw 74 threadedly engaging an internally threaded hole in a lug 75 secured to the carriage 20 and disposed to cooperate with a movable bracket 76 releasably secured to the guide bar 23. An outwardly extending arm 77 integrally formed with the bracket 76 is provided with a vertical slot or notch 78 forming a bearing in which one end of the adjusting screw 74 is removably received, as shown in Figs. 1 and 7. A pair of collars 79 and 80 secured to the adjusting screw 74 in spaced relationship on either side of the bracket arm 77 are disposed to retain the screw 74 in rotatable engagement therewith as it is turned by means of an adjusting knob 81. With the bracket 76 clamped in predetermined position on the guide bar 23, rotational movement of the adjusting screw 74 will effect lateral movement of the carriage 20 a required distance along the guide bar 23. To accurately measure the lateral displacement of the work gauge 18 relative to the saw blade 16, an adjustable pointer 84 secured to the carriage 20 is disposed to cooperate with a scale 85 formed on the top surface of the rectangular guide bar 23.

As shown in Fig. 7, the bracket 76 is provided with top and bottom flanged bearing surfaces 86 and 87, respectively, arranged to slidably engage the guide bar 23. A clamp screw 88 threaded through the front wall of the bracket 76 is operative to clamp the bracket to the guide bar 23 in a predetermined adjusted position. With the screw 88 in unclamped position, the carriage 20 and the bracket 76 may be slidably moved along the guide bar 23 as a single structure, by means of the interconnecting adjusting screw 74, to the approximate position required. The clamp screw 88 may then be actuated to clamp the bracket 76 to the guide bar and the adjusting knob 81 rotated for effecting a final precise adjustment of the carriage 20 to position the fence 19 the required distance from the saw blade 16.

By means of this arrangement, the entire work gauge 18 including the adjusting screw 74 may be removed from its position on the top surface of the table 15, the vertical slot 78 permitting disengagement of the adjusting screw 74 from the bracket arm 77. The adjusting bracket 76 may then be parked in any convenient position along the guide bar. Since no part of the adjusting bracket 76 projects above the surface of the work table 15, it will not interfere with the performance of a cross cutting operation.

As shown in Figs. 1 and 2, the ripping fence 19 is positioned on the table 15 rightwardly of the saw blade 16 and the adjusting mechanism 73 is positioned on the guide bar 23 leftwardly of the carriage 20 toward the front central part of the table. For some ripping operations, however, it may be advantageous to remove the work gauge 18 from its rightward position, as shown in Figs. 1 and 2, and replace it on the work table in a position leftwardly of the saw blade 16. To obtain the full range of lateral adjustment of the fence 19 in an operating position leftwardly of the saw blade 16, the position of the adjusting mechanism 73 relative to the carriage 20 may be reversed and the mechanism operatively connected to effect lateral adjustment of the carriage 20 from its opposite or rightward side. To this end, there is provided at the front rightward side of the carriage 20 a second lug 89 spaced rightwardly from the lug 75 and in a similar manner provided with an internally threaded hole disposed to be operatively engaged by the adjusting screw 74. The adjusting screw 74 may be disengaged from the leftward lug 75 by removing a stop screw 90 threaded in its end and replaced in threaded engagement with the rightward lug 89. The adjusting bracket 76 may then be repositioned on the guide bar 23 rightwardly of the carriage 20 to rotatably support the portion of the adjusting screw 74 between the collars 79 and 80.

Another principal advantage afforded by the work gauge 18 illustrated in the drawings as exemplifying the invention, is the rigidity and accuracy with which the fence 19 is disposed to guide a workpiece during a ripping operation, as well as the freedom from any binding action between the rearward end of the fence 19 and the workpiece. The fence 19 is constructed in the shape of a hollow U-shaped bar having its top and side walls of substantially uniform thickness throughout their entire length to prevent springing or bowing of the fence by lateral pressure of a workpiece as it is fed to the rotating saw blade. As shown in Fig. 1 however, the rearward end of the fence 19, beginning at a point immediately beyond the rearward edge of the saw blade 16, is slightly narrower than the forward or work guiding end thereof to provide sufficient clearance 93 for the workpiece to expand laterally as a ripping operation is performed. Since some kinds of wood have a tendency to spring apart as a cutting operation is completed, the clearance or relief 93 at the rearward end of the fence 19 is disposed to prevent any binding action between the fence and the workpiece, thereby preventing any tendency of the cut edge of the workpiece to be crowded back toward the teeth at the rear side of the saw blade 16. The scraping engagement of the rear teeth of the saw blade against the cut edge of the workpiece as it is forced back toward the saw blade by the rearward end portion of prior types of full length ripping fences is one of the primary causes of kickback with all of its attendant danger to the machine operator. As is well known in the art, kickback involves the sudden ejection of a workpiece in a forward direction toward the machine operator by the rapidly rotating saw blade and often results in injury to the operator, as well as damage to the work. By lessening the possibility of kickback, the relief or clearance 93 at the rearward end of the fence 19 reduces the hazards incident to the operation of a circular sawing machine, thereby affording additional protection to the machine operator.

In a modified form of the invention shown in Figs. 10 and 11, the locking or clamping action is effected by bodily movement of the fence member 19 in a rearward direction. To this end, resilient means are provided to urge the longitudinal fence member 19 in a forward direction in manner that a locking element 94 depending from the rearward end of the fence is normally retained in disengaged or unclamped position relative to a rectangular guide bar 95 secured to the rearward vertical edge 27 of the table 15. A modified fence supporting carriage 96 is provided with a stationary horizontal bearing surface 97 and spaced vertical bearing surfaces 98 and 99 respectively disposed to slidably engage the top horizontal surface 29 and the rearward vertical surface 38 of the guide bar 23. To retain the vertical bearing surfaces 98 and 99 of the carriage 96 in slidable engagement with the rearward surface 38 of the guide bar 23, a pair of contact shoes 104 and 105 secured at the inner ends of axially slidable guide rods 106 and 107 spaced toward the opposite sides of the carriage 96, are resiliently urged into abutting engagement with the front surface 32 of the guide bar 23. As shown in Figs. 10 and 11, a pair of compression springs 108 and 109 are disposed to urge the movable contact shoes 104 and 105 respectively in a rearward direction. To selectively move the contact shoes 104 and 105 in a forward direction in opposition to the springs 108 and 109, as for example in preparing for removing or replacing the carriage 96 on the guide bar 23, adjusting knobs 110 and 111 are secured to the forward ends of the guide rods 106 and 107, respectively.

The carriage 96 is laterally adjustable along the guide bar 23 in the manner previously described to guide the fence 19 for lateral adjustment along the table 15. Since the fence 19 is perpendicular to the stationary vertical bearing surfaces 98 and 99 of the carriage 96, the resiliently actuated contact shoes 104 and 105 operate automatically to reestablish the fence 19 in parallelism with the saw blade after lateral adjustment has been effected.

To minimize friction and to facilitate lateral adjustment of the fence 19, the locking element 94 secured to the rearward end thereof is provided toward its lower end with a horizontal bearing surface 114 disposed to slidably engage a top horizontal surface 115 of the guide bar 95 secured to the rearward edge of the table 15. The rear guide bar 95 is disposed in parallelism with the front guide bar 23 and is likewise perpendicular to the saw blade 16. The ripping fence 19 is thus elevated slightly above the top surface of the table 15, by means of the horizontal bearing surface 114 of the locking element 94 engaging the top surface 115 of the rear guide bar 95 and the horizontal bearing surface 97 of the carriage 96 engaging the top surface 29 of the front guide bar 23.

To provide for endwise movement of the fence 19 into clamping engagement with the table 15, the fence is secured at its forward end to a movable support member 116 by means of cap screws 117. The support member 116 is slidably mounted on a circular guide bar 118 extending forwardly from and secured to the carriage 96 by means of a set screw 120. A pilot rod 121 secured to the carriage 96 in axial parallelism with the circular guide bar 118 is disposed to engage the forked arms of a bracket 122 secured to the support member 116 in manner to prevent pivotal movement of the support member about the circular guide bar 118. A compression spring 123 seated at one end within a bored hole formed in the support member 116 is seated at its other end against the front face of the carriage 96 to urge the support member 116 and the fence 19 in a forward direction relative to the carriage. The circular guide bar 118 is provided at its forward end with a rectangular extension 124 disposed to project through a vertical slot in the front end of the support member 116 in a manner to pivotally support a clamp lever 125. The clamp lever 125 is provided with a bifurcated lower end portion 128, shaped in the form of a cam, and disposed to cooperate with the front end of the support member 116 to effect selective rearward movement of the fence 19. With the clamp lever 125 in a vertical or unclamped position, as shown in Fig. 10, a flat 129 formed on the cam shaped lower end portion 128 thereof provides a stop for limiting the forward movement of the support member 116 as effected by the spring 123.

To clamp the fence 19 to the table 15 in a selected position of lateral adjustment, the lever 125 is pivoted forwardly to effect rearward movement of the fence 19 relative to the carriage 96 thereby bringing a vertical surface 130 formed at the lower end of the locking element 94 into abutting engagement with the front face 131 of the rear guide bar 95. The vertical surface 130 of the locking element 94 is urged into clamping engagement with the rear guide bar 95 in opposition to the bearing surfaces 98 and 99 of the carriage 96 being maintained in abutting engagement with the rear surface of the front guide bar 23.

Another modification of the invention, as shown in Fig. 12, incorporates a depending U-shaped clamping member 132 secured to the rearward end of the longitudinally movable fence member 19. As there shown, the clamp member 132 comprises a vertical bar 133 secured to the rearward end of the fence 19 by means of cap screws 134 and extending downwardly to project slightly below a rearward wall 135 of the table. A short horizontal connecting bar 136 is secured as its rearward end to the lower end of the bar 133 and at its opposite end to a vertical abutment 137. Movement of the pivotal lever 125, Fig. 10, in a forward direction operates to effect rearward movement of the fence 19 in a manner that the vertical abutment 137 of the clamping member 132 is brought into clamping engagement with the inner surface of the rear wall 135 of the table 15.

From the foregoing description of an illustrative circular sawing machine embodying this invention, it is apparent that there has been provided an improved ripping fence disposed to be quickly and conveniently adjusted along the work table into any selected position at the required distance from the saw blade. As more fully explained hereinbefore, the ripping fence is provided with a transversely movable guiding carriage including automatically operative resilient means disposed to retain the longitudinal fence member in work guiding parallelism with the saw blade regardless of its laterally adjusted position on the table. In order that the fence may be rigidly clamped to the table in a predetermined position of adjustment therealong, the fence member is movably secured to its supporting carriage for longitudinal movement relative to the carriage and into clamping engagement with the table. To more accurately guide a workpiece during a ripping operation and to minimize the possibility of kickback, with its attendant danger to a machine operator, the rearward end of the fence is so formed as to permit a slight lateral movement of the workpiece after it has been separated by a cutting operation.

Although several exemplary embodiments of the invention have been shown and described in some detail for the purpose of fully disclosing the manner in which the invention may be practiced, it will be apparent to those skilled in the art to which this invention relates that the various novel features may be incorporated in still other structural forms without departing from the spirit and scope of the invention as defined in the subjoined claims.

The principles of the invention having now been fully explained in connection with embodying structures, I hereby claim as my invention:

1. In a ripping fence for a circular sawing machine having a front guide bar and a rearward way surface spaced in parallelism, a power driven sawing tool adapted to rotate in a plane perpendicular to said guide bar, a carriage slidably and removably carried by said guide bar, an adjusting bracket including a yoke slidably carried by said guide bar independently of said carriage for transverse adjustment, clamping means adapted to releasably clamp said adjusting bracket to said guide bar, an adjusting screw threaded in said carriage disposed to removably engage said yoke, said adjusting screw being operative to effect a precise transverse adjustment of said carriage relative to said bracket, resiliently actuated bearings connected to retain said carriage in slidable abutting engagement with said guide bar, a fence member slidably secured to said carriage for longitudinal movement in a plane transverse to the plane in which said carriage is slidable, said fence member extending rearwardly across said table and having its rearward portion narrower than its forward work guiding portion to permit a workpiece to expand laterally after being separated by a sawing operation, a clamp element secured to the rearward end of said fence member for movement therewith into releasable clamping engagement with the said rearward way surface, and a clamp lever operatively connected to urge said fence member longitudinally relative to said carriage for moving said clamp element into engagement with said rearward way surface in opposition to the abutting engagement of said carriage with said guide bar.

2. In combination with a saw table having front and rear edges spaced in parallelism, a guide bar secured to the said front table edge in parallel outwardly spaced relationship, a carriage having a complementary guiding surface slidably carried by said guide bar for transverse movement relative to said table, a stationary guide member fixedly secured to said carriage in perpendicular relationship to the said guiding surface thereof, a fence support disposed to slidably engage said guide member for a limited rectilinear movement, a guide fence secured at its forward end to said fence support and arranged to extend longitudinally across the surface of said table to the said rearward edge thereof for longitudinal movement in a plane perpendicular to the said guiding surface of said carriage, said fence and said carriage being transversely movable along said table as a single unitary structure, said fence being guided by said fence support for longitudinal clamping movement along the surface of said table and relative to said carriage, a depending clamp element fixedly secured to the rearward end of said fence and being longitudinally movable therewith into releasable clamping engagement with the said rear table edge, a spring connected to urge said fence support and said fence rearwardly relative to said carriage to normally retain said clamp element in unclamped position, and a pivotal clamping lever operatively connected to effect forward longitudinal movement of said fence support and said fence relative to said carriage in opposition to said spring to urge said depending clamp element into clamping engagement with the said rear table edge.

3. In a ripping fence for a circular sawing machine, a work supporting table having front and rear guideways spaced in parallelism, a carriage having a complementary flat guiding portion slidably carried by said front guideway for transverse movement relative to said table, guide means carried by said carriage, a fence member slidably engaged at its forward end by said carriage guide means for rectilinear movement in a plane perpendicular to the said flat guiding portion of said carriage, said fence member extending rearwardly across the surface of said table and being longitudinally movable relative to said carriage, said fence member and said carriage being transversely positionable along said table as a single unitary structure, a clamp element secured to the rearward end of said fence for movement therewith into releasable clamping engagement with the said rear table guideway, and a movable lever operatively connected to effect longitudinal movement of said fence member relative to said carriage for urging said rear clamp element into clamping engagement with said rear table guideway.

4. In a sawing machine, a work supporting table presenting a slot, a saw blade disposed to project through said slot, a pair of mutually parallel guiding surfaces respectively located at the front and rear edges of said table in perpendicular relationship to the plane of said saw blade, a ripping fence extending across said table from the said front guiding surface and disposed to be transversely positionable relative to said saw blade said fence being formed in the shape of a hollow U-shaped section having its rearward walls spaced closer together than its forward or work guiding walls in a manner to permit a workpiece to expand laterally after it has been separated by the said saw blade, a clamp element secured to the rearward end of said fence in position to be moved longitudinally therewith into releasable clamping engagement with the said rear guiding surface of said table, a transversely movable carriage operatively disposed to guide said fence for transverse movement along the top surface of said table in parallelism with said saw blade, said carriage being provided with a complementary flat guiding portion disposed to slidably engage the said guiding surface at the front edge of said table, resiliently actuatable bearings operatively arranged to retain the said flat guiding portion of said carriage in slidable abutting engagement with the said front guiding surface of said table, a guide member secured to said carriage and extending forwardly in perpendicular relationship to the said guiding portion thereof, a fence support apertured to slidably engage said guide member for selective rectilinear movement, said fence support being secured to the forward end of said fence and being adapted to guide said fence for limited longitudinal movement in a plane perpendicular to the said flat guiding portion of said carriage, resilient means operatively connected to urge said fence rearwardly relative to said carriage for retaining said clamp element in unclamped position, and a clamp lever operatively connected to effect forward movement of said fence and said fence support relative to said carriage and in opposition to said resilient means to urge the said clamp element into clamping engagement with the said rear guiding surface of said table.

5. In combination with a work supporting table for a circular sawing machine, a laterally adjustable ripping fence including a guiding carriage movably secured thereto, said fence being disposed to extend longitudinally across said table from its front to its rearward edge and being guided by said carriage for selective longitudinal clamping movement relative to said table and said carriage, said fence being so formed that its rearward portion is narrower in width than its forward work guiding portion to permit a workpiece to expand laterally after being separated by a sawing operation, depending clamping means associated with said fence and being movable therewith into releasable clamping engagement with said table, and an actuating lever carried by said carriage connected to effect selective longitudinal clamping movement of said fence relative to said carriage.

6. In a sawing machine, a work supporting table having front and rear edges spaced in parallelism and presenting a slot in its top surface, a circular sawing tool projecting through said slot in a manner to perform a cutting operation upon a workpiece carried by said table, said sawing tool being carried in a plane perpendicular to the said front edge of said table, a guide bar secured to the said front edge of said table in outwardly spaced parallelism, a carriage having a flanged bearing surface disposed to slidably engage the top and front surfaces of said guide bar, a pair of bearings movably carried by said carriage arranged to engage the rearward surface of said guide bar, resilient means connected to so urge said bearings into engagement with the rearward surface of said guide bar that the said flanged bearing surface of said carriage is retained in slidable abutting engagement with the front surface of said guide bar, a guide member extending forwardly from the said carriage in perpendicular relationship to the said flanged bearing surface thereof, a fence support having an opening of complementary shape disposed to slidably engage said guide member, said fence support being slidably carried for rectilinear movement in a plane perpendicular to the said flanged bearing surface of said carriage, a ripping fence fixedly secured at its forward end to said fence support and extending longitudinally across the surface of said table in fixed perpendicular relationship to the said flanged surface of said carriage, a depending clamp element secured to the rear end of said fence for longitudinal movement therewith into clamping engagement with the said rear edge of said table, said fence being guided by said carriage for transverse movement therewith along the top surface of said table in parallelism with said sawing tool, said fence being guided by said fence support for a slight longitudinal clamping movement relative to said carriage, a spring operatively connected to effect rearward movement of said fence support and said fence relative to said carriage, and a pivotal clamp lever operatively connected to effect a forward longitudinal movement of said fence support and said fence relative to said carriage and in opposition to said spring to urge said clamp element into clamping engagement with the said rear edge of said table.

7. In a ripping fence for a circular sawing machine, a work supporting table having front and rear guideways spaced in parallelism, a carriage slidably carried by said front table guideway for transverse movement, a stationary guide member secured to said carriage and extending in a plane perpendicular to the plane in which said carriage is movable, a fence support slidably engaged by said carriage guide member for rectilinear movement, a fence member secured at its forward end to said fence support and extending longitudinally across the surface of said table to the said rear table guideway, said fence member being guided by said fence support for longitudinal clamping movement relative to said carriage, said fence member being guided by said carriage for transverse positioning movement therewith along the surface of said table, a depending clamp member secured to the rearward end of said fence member, said depending clamp member being movable into clamping engagement with the said rear table guideway whenever said fence member is moved longitudinally in one direction relative to said carriage, resilient means operatively connected to effect longitudinal movement of said fence member in the opposite direction relative to said carriage to normally retain said clamp member in unclamped position, and a movable clamp lever operatively connected to effect longitudinal movement of said fence member relative to said carriage in opposition to said resilient means for moving said clamp member into clamping engagement with the said rear table guideway.

8. In a work gauge for a circular sawing machine, a guide bar, a carriage slidably and removably mounted on said guide bar, resiliently actuated bearings connected to retain said carriage in slidable abutting engagement with said guide bar, a fence member slidably secured to said carriage for longitudinal movement in a plane transverse to the plane in which said carriage is slidable, a stationary abutment surface positioned in parallel spaced relationship to said guide bar, a locking element secured to the rearward end of said fence member for movement into releasable clamping engagement with said abutment surface, resilient means connected to urge said fence member longitudinally in one direction relative to said carriage in a manner that said locking element is in disengaged position relative to said abutment surface, and a lever associated with said fence member operatively connected to urge said fence member in the other direction relative to said carriage in opposition to said resilient means to urge said locking element into clamping engagement with said abutment surface.

9. In a ripping fence for a circular sawing machine having a pair of guiding surfaces spaced in parallelism, a carriage disposed to be guided by one of said surfaces for slidable transverse movement therealong, a fence member slidably mounted on said carriage for longitudinal movement in a plane transverse to the plane in which said carriage is movable, a locking element secured to said fence member and being movable therewith into clamping engagement with the other of said guiding surfaces, and a lever operatively connected to effect longitudinal movement of said fence member relative to said carriage to urge said locking element into locking engagement with the said guiding surface associated therewith in opposition to the engagement of said carriage with the said guiding surface associated therewith.

10. In a ripping fence for a circular sawing machine, a work supporting table having front and rear guideways spaced in parallelism, a carriage having a complementary guiding surface slidably carried by said front guideway for transverse positioning movement relative to said table, a ripping fence member movably secured at its forward end to said carriage and extending rearwardly across said table, guide means associated with said carriage arranged to slidably engage said fence member in such a manner as to guide said fence member for longitudinal movement relative to said carriage in a plane perpendicular to the said guiding surface thereof, said carriage and said fence member being fixedly retained in perpendicular relationship by said guide means and being transversely positionable along said table as a single unitary structure, a clamp element secured to the rearward end of said fence member and being movable therewith into clamping engagement with the said rear guideway of said table, and a clamp lever operatively connected to effect longitudinal movement of said fence member relative to said carriage to urge said clamp element into clamping engagement with the said rear guideway of said table.

References Cited in the file of this patent

UNITED STATES PATENTS

| Number | Name | Date |
|---|---|---|
| 426,617 | Hales | Apr. 29, 1890 |
| 481,983 | Thom | Sept. 6, 1892 |
| 1,485,149 | Renken | Feb. 26, 1924 |
| 1,790,288 | Tautz | Jan. 27, 1931 |
| 2,104,158 | Hedgpeth | Jan. 4, 1938 |
| 2,273,715 | Lonskey et al. | Feb. 17, 1942 |
| 2,356,324 | Kendle et al. | Aug. 22, 1944 |
| 2,556,548 | Modderman | June 12, 1951 |
| 2,562,246 | Van Dam et al. | July 31, 1951 |